C. H. HAPGOOD.
SCALE.
APPLICATION FILED JULY 18, 1910.
1,142,165.
Patented June 8, 1915.
2 SHEETS—SHEET 1.
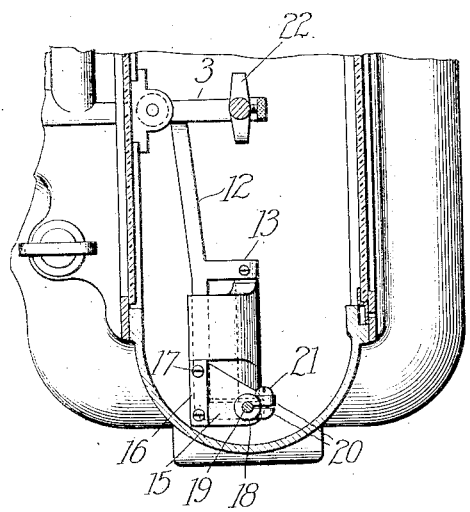
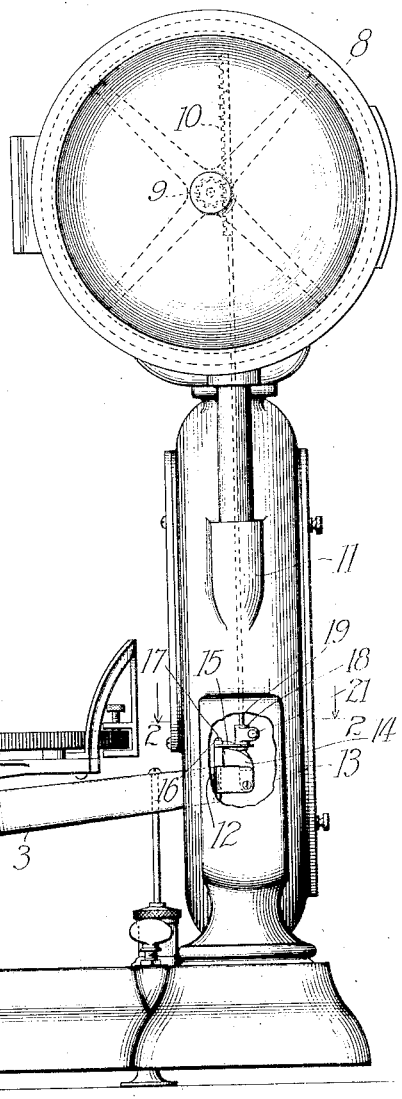
Witnesses
Martin H. Olsen.
Robert Dobberman
Inventor
Clarence H. Hapgood
By Rector, Hibben, Davis & Macauley
attys C. H. HAPGOOD.
SCALE.
APPLICATION FILED JULY 18, 1910.
1,142,165.
Patented June 8, 1915.
2 SHEETS—SHEET 2.
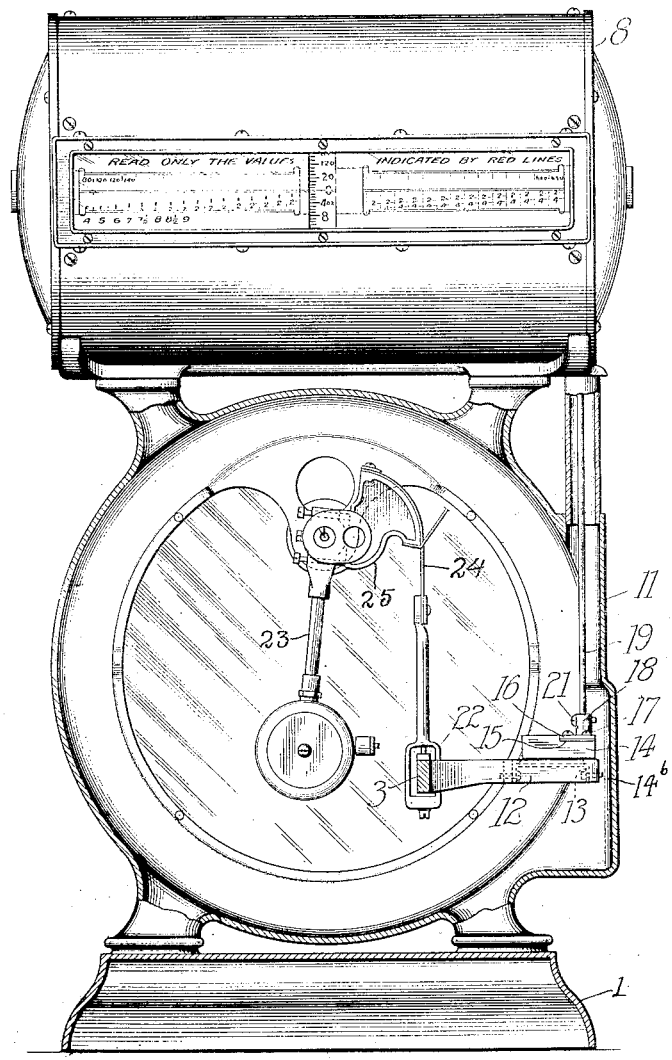
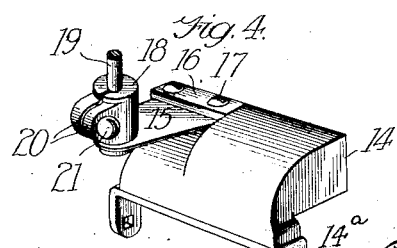
Witnesses
Martin H. Olsen
Robert Dobberman
Inventor
Clarence H. Hapgood

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

SCALE.

1,142,165.  Specification of Letters Patent.  Patented June 8, 1915.

Application filed July 18, 1910. Serial No. 572,474.

*To all whom it may concern:*

Be it known that I, CLARENCE H. HAPGOOD, a citizen of the United States, residing at Toledo, in the county of Lucas and State of Ohio, have invented certain new and useful Improvements in Scales, of which the following is a specification.

My invention relates more particularly to scales having indicating mechanism operated from a moving part of the scale. Where the indicator mechanism is of more than an inconsiderable mass, the sudden movement of the scale member due for example to placing a heavy article upon it is apt to injure or wear the mechanism for transmitting motion to the indicating device.

It is the object of my present invention to reduce or obviate injury to the scale by reason of such sudden impulses by interposing between the scale member and the mechanism a spring or other resilient device which will take up the shock or jar.

My invention is shown in the accompanying drawings in which—

Figure 1 is a side elevation of a scale partly broken away to show the operating mechanism; Fig. 2 is a horizontal section on the line 2—2 of Fig. 1 of that part of the apparatus to which my invention particularly relates; Fig. 3 is an elevation partly in section of the scale at right angles to Fig. 1; and Fig. 4 is a detail perspective.

The particular form of scale in connection with which I have illustrated my invention is a platform scale with a computing cylinder indicator though it will be obvious that the invention is of wide application and may be used in connection with any scale having indicator mechanism operated from the scale through connections liable to injury by shock or jar. In this particular embodiment shown in the drawings the base 1 supports the standards 2 in which the beam 3 is pivoted. The beam is counterweighted as at 4 and carries the platform 5 which is maintained in substantially horizontal position by the rod 6 connected to the link 7 which is pivoted at a suitable point beneath the standard to the platform. The indicator mechanism consists of a cylinder mounted on trunnions within the casing 8 provided at one end with a pinion 9 which meshes with a rack 10. The rack is extended in the form of a rod 11 by which it is pivotally connected to the scale beam.

The apparatus thus far described is old in the art as shown for example in the patent to Hapgood, No. 903,083, patented November 3, 1908.

As indicated above it has been found that where the connection between the beam and the indicating mechanism is inelastic a certain amount of injury is done to the mechanism of the indicator by shocks and jars caused by the sudden placing or dropping of heavy articles upon the platform. In my improved scale this is obviated by the following construction. The scale beam is provided at its end with an arm or bracket 12 extending at right angles thereto and provided near its end with a pair of lugs 13 with horizontal perforations near their outer ends. A casting 14 is pivoted between these lugs in such a manner that it is capable of a rocking movement, by means of a plate 14′ secured to one edge of the bottom of the casting and provided with downwardly extending perforated ears 14ᵃ 14ᵃ which receive screws or pins 14ᵇ extending through the lugs upon the bracket 12 for this purpose. The perforations in the ears 14ᵃ—14ᵃ may be square if desired and the pins 14ᵇ, corresponding in shape at the portions thereof which engage these perforations in order that the rotation of the pin may be with respect to the ears 13 on the beam where longer bearings are provided. If desired, however, the pins may be rounded throughout their length and the holes in the ears 14ᵃ corresponding in shape. A substantially triangular leaf spring 15 is secured at one edge to the casting by a reinforcing strip 16 and screws 17 and at its opposite corner is provided with a socket 18 for the reception of the connecting rod 19. This socket is split and provided with lugs 20 through which extends a screw 21 by which the socket may be tightened around the connecting rod. It may also be tapped if desired for greater security and the connecting rod correspondingly threaded at its end.

It will be obvious that the spring normally occupies an intermediate position from which it may be flexed in either direction and is therefore double-acting. The beam 3 is connected with a pendulum counterbalance 23 through a stirrup 22, band 24 and segment 25. The pendulum counterbalance, however, is shown in the patent to De Vilbiss 839,736, dated December 25, 1906, and forms no part of my present invention.

What I claim is:

1. In a scale, a beam, a rocking member pivoted thereon and carrying a leaf spring, and connections for moving the indicating mechanism connected to the leaf spring.

2. In a scale, the combination with the beam and indicating mechanism, a rack and pinion for operating the indicating mechanism and connections between the rack and the beam including a rocking member pivoted to the beam and carrying a leaf spring to which the rack is connected.

3. In a weighing scale having a rotary cylinder indicator, a beam 3 having an offset member 12, lugs 13, upon the member 12, a rocking member 14 pivoted between the lugs, a spring 15 secured along one edge to the rocking member and provided at its outer end with a collar 18, a rack bar 19 secured at one end within the collar, and a pinion upon the rotary cylinder with which the rack bar coöperates.

4. In a weighing scale having a beam and a computing drum, a connecting rod for rotating the latter, a casting pivoted to the scale beam and a spring connecting the casting and connecting rod.

5. In a weighing scale having a beam and a pinion on the shaft of a rotary indicator, a rack rod, the rack of which meshes with said pinion, a casting pivoted to the beam, a spring connecting the casting and rack rod, said casting being overweighted on that side of its pivotal axis on which the pinion is located.

6. In a weighing scale of the class described, having a beam and a rotary indicator, a pinion on the shaft of the latter, a rack rod, the rack of which meshes with the pinion, a casting pivoted to the beam and over-weighted on that side of the pivotal axis thereof upon which the pinion is located and a leaf spring rigidly connected to the rack rod at one end and at the other to the casting at a point thereof at one side of the vertical plane of its pivots, the rack rod being supported substantially in said plane.

CLARENCE H. HAPGOOD.

Witnesses:
 ALLEN DE VILBISS, Jr.,
 E. LONGENECKER.